Aug. 16, 1955  E. G. K. SCHWARZ  2,715,684
RADIATION DETECTION INSTRUMENT
Filed Sept. 2, 1954
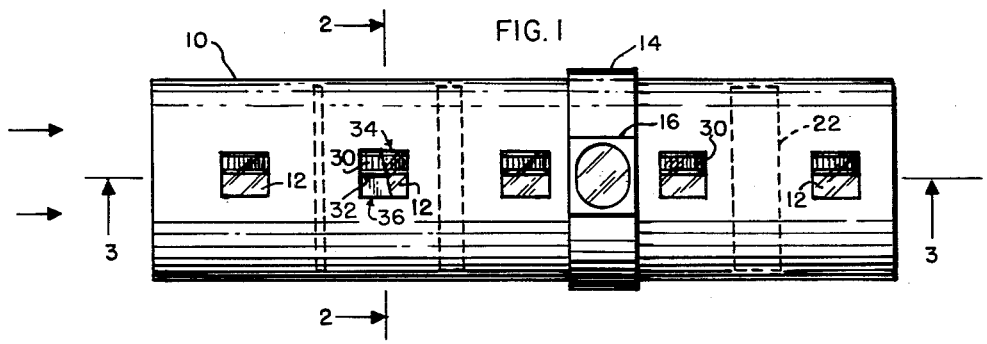
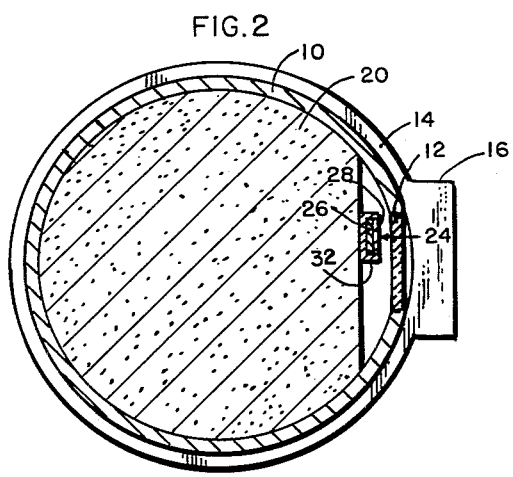
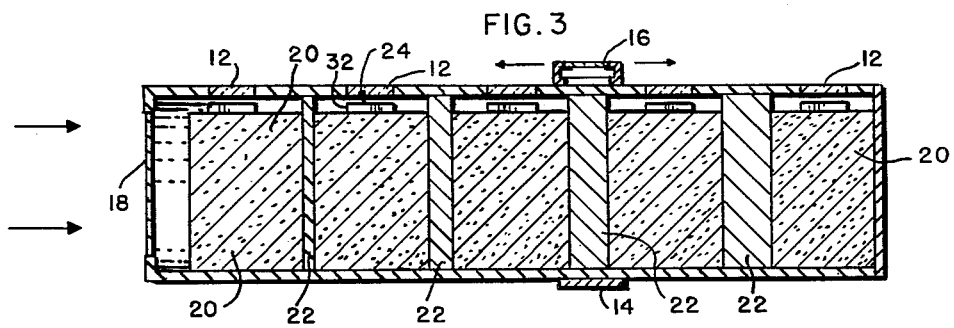
INVENTOR.
ERICH G. K. SCHWARZ
BY
Harry M. Saragovitz
ATTORNEY

United States Patent Office 2,715,684
Patented Aug. 16, 1955

2,715,684

RADIATION DETECTION INSTRUMENT

Erich G. K. Schwarz, Eatontown, N. J., assignor to the United States of America as represented by the Secretary of the Army Application September 2, 1954, Serial No. 453,976

7 Claims. (Cl. 250—71)

(Granted under Title 35, U. S. Code (1952), sec. 266)

The invention described herein may be manufactured and used by or for the Government for governmental purposes, without the payment of any royalty thereon.

The invention relates to radiation detection instruments and more particularly to an improved meter for measuring dosage-rates of gamma radiation.

It is the primary object of the present invention to provide a simple instrument for measuring the dosage rates of gamma radiation.

It is a further object to provide an instrument as set forth in the preceding object without necessitating the use of external sources of electrical power and vacuum tube amplifiers.

In accordance with the present invention, there is provided an instrument for determining gamma radiation dosage rate comprising a housing, a plurality of crystals arranged in seriatim therein which luminesce upon being subjected to gamma radiation, a plurality of gamma radiation absorbers between adjacent crystals, said absorbers being of progressively increasing gamma radiation absorption capacity whereby a correspondingly greater gamma radiation energy is required to cause each succeeding crystal to luminesce and light comparison means associated with each of said crystals.

For a better understanding of the invention, together with other and further objects thereof, reference is had to the following description taken in connection with the accompanying drawings and its scope will be pointed out in the appended claims.

In the drawings,

Fig. 1 is a plan view of a preferred embodiment of the present invention;

Fig. 2 is a section taken along line 2—2 of Fig. 1 looking in the direction of the arrows and Fig. 3 is a vertical longitudinal section taken along line 3—3 of Fig. 1.

Referring more particularly now to Figs. 1 and 2, there is shown a housing 10 which may be of circular or rectangular cross section and of rectangular configuration in its longitudinal aspect. Housing 10 consists of a material which is a good gamma ray absorber, a preferable example of such a material being lead. Longitudinally spaced on the periphery of housing 10 are viewers 12 consisting of a transparent material such as a glass, Plexiglas and the like which serve as split field comparison viewers, their structure and function being explained in greater detail hereinbelow. A slidable ring 14 engirdling housing 10 and having affixed thereon a light shielding viewing hood 16 is provided for shielding viewers 12 from outside light when the interior of housing 10 is observed therethrough.

Referring now to Fig. 3, there is shown a beta ray absorbing window 18 which may consist of any material that is a good beta absorber but transparent to gamma radiation, a cheap practical example of such a material being aluminum. Spaced from window 18 are a plurality of serially arranged crystals 20 which luminesce upon being subjected to gamma rays. Crystals 20 may consist of alkali halides activated with copper, silver, tin and thallium, a specific example being a thallium activated potassium iodide crystal. The respective thicknesses of crystals 20 are not critical and they may be varied without influencing the operation of the present invention. Intermediate and in contact with adjacent crystals 20 are absorbers 22 which absorb gamma rays. Absorbers 22 may consist of a high atomic number material, lead being a preferable example. Associated with a peripheral portion of each crystal 20 and visible through viewer 12 are self luminescent elements 24. Elements 24 may consist of a metal member 26 upon which there has been applied, by spraying, or other well known methods, a self luminescent substance 28. Substance 28 may be a self-luminescing phosphor such as a silver activated zinc sulfide, a radium paint or the like. Substance 28 may be subdivided into zones 30 to provide various degrees (Fig. 1) of luminescence intensity. This may readily be accomplished by incorporating substance 28 into a carrier such as a transoptic powder, an acrylic resin and the like in defined zones of differing concentrations so light of respective different intensities will be emitted therefrom. Element 24 is most conveniently affixed to crystal 20 by binding etc., and is shielded from gamma radiation by a gamma ray absorbing material 32 such as lead.

Referring back to comparison viewers 12 shown in Fig. 1, each of these viewers are in register with a different crystal 20. When the interior of housing 10 is viewed through a viewer 12, through one portion 34 there is seen self luminescing element 24 with its various zones 30 and through the other portion 36 there is seen the crystal 20 which is in register therewith.

In operation, gamma radiation falling upon housing 10 will be absorbed thereby so that only gamma radiation incident to the surface of crystals 20 will enter housing 10. By this arrangement the gamma radiation being deleted is collimated into a beam substantially perpendicular to the plane of the trips of crystals 20. When incident radiation hits window 18, beta radiation is absorbed and gamma radiation passes through to impinge upon the first crystal 20 in housing 10. The gamma irradiated crystal fluoresces and is usually compared with the luminescence of element 24 which serves as the light comparison standard. To reach the next succeeding crystal, obviously the gamma radiation must be of a much greater energy as absorbers 22 will absorb a good part of the softer component of the radiation, and crystal 20 will also absorb some of the radiation. It can be seen that by calculating the absorption conditions of crystals 20 and absorbers 22, the absorption thickness of absorbers 22 may be predetermined and consequently the luminescence of each succeeding crystal may be produced within a predetermining range of radiation energy. Of course instead of making absorbers 22 of different thicknesses, they may consist of materials having different degrees of gamma radiation absorption. It is preferable that the preferential total absorption occur at about 90% of the total length of housing. With the provision of various zones of self luminescence 30 an element 24, the luminescence range of each irradiated crystal is subdivided into further portions so that a quite accurate judgment of the gamma radiation dosage rate within each energy range may be made visually. Thus the present invention provides a simple instrument in which the instantaneous dosage rate within preselected energy ranges may be determined and there is not required any power sources, vacuum tube amplifiers and the like.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An instrument for determining gamma radiation dosage rate comprising a housing consisting of material having a high atomic number, a window which absorbs beta radiation but is transparent to gamma radiation at one end thereof, a plurality of crystals arranged in seriatim therein which fluoresce upon being subjected to gamma radiation, a plurality of discrete gamma radiation absorbers between adjacent crystals, said absorbers being of progressively increasing gamma radiation absorption capacity whereby a correspondingly greater predetermined gamma radiation energy is required to cause each succeeding crystal to fluoresce, discrete light comparison means corresponding to predetermined gamma radiation dosages associated with each of said crystals, means for shielding said light comparison means from said gamma radiation, and discrete transparent portions in said housing through which the comparison of the fluorescence of each of said crystals and the luminescence of its associated light comparison means may be observed.

2. An instrument as defined in claim 1 wherein said housing consists of lead.

3. An instrument as defined in claim 1 wherein said crystals consist of alkali halides activated with an element selected from the group consisting of copper, silver, tin and thallium.

4. An instrument defined in claim 3 wherein said crystals consist of potassium iodide activated with thallium.

5. An instrument as defined in claim 1 wherein said window consists of aluminum.

6. An instrument as defined in claim 1 wherein said absorbers consist of lead.

7. An instrument as defined in claim 1 wherein said light comparison means consists of zinc sulfide activated with silver.

References Cited in the file of this patent

UNITED STATES PATENTS

| | | |
|---|---|---|
| 2,426,884 | Kieffer | Sept. 2, 1947 |
| 2,578,703 | Hopkins | Dec. 18, 1951 |
| 2,585,551 | Hofstadter | Feb. 12, 1952 |